(12) United States Patent
Peng (10) Patent No.: US 11,305,881 B2
(45) Date of Patent: Apr. 19, 2022

(54) ARM FOR UNMANNED AERIAL VEHICLE

(71) Applicant: SUZHOU XINGZHEN INTELLIGENT TECHNOLOGY CO., LTD., Suzhou (CN)

(72) Inventor: Fangming Peng, Suzhou (CN)

(73) Assignee: SUZHOU XINGZHEN INTELLIGENT TECHNOLOGY CO., LTD., Suzhou (CN)

( * ) Notice: Subject to any disclaimer, the term of this patent is extended or adjusted under 35 U.S.C. 154(b) by 527 days.

(21) Appl. No.: 16/510,996

(22) Filed: Jul. 15, 2019

(65) Prior Publication Data

US 2020/0307814 A1 Oct. 1, 2020

(30) Foreign Application Priority Data

Mar. 26, 2019 (CN) .......................... 201920389391.9

(51) Int. Cl.
*B64D 27/26* (2006.01)
*B64C 27/20* (2006.01)
*F16B 2/06* (2006.01)

(52) U.S. Cl.
CPC .............. *B64D 27/26* (2013.01); *B64C 27/20* (2013.01); *F16B 2/065* (2013.01); *B64C 2201/027* (2013.01); *B64C 2201/108* (2013.01); *B64D 2027/262* (2013.01)

(58) Field of Classification Search
CPC .. B64D 27/26; B64D 2027/262; B64C 27/20; B64C 29/05; B64C 39/024; B64C 2201/108; B64C 2201/165; B64C 2201/027; F16B 2/065; F16B 7/0486
See application file for complete search history.

(56) References Cited

U.S. PATENT DOCUMENTS

| | | | | |
|---|---|---|---|---|
| 7,003,383 | B2 * | 2/2006 | Rumbo ................ | G05D 1/0202 701/410 |
| 9,868,524 | B2 * | 1/2018 | Welsh ..................... | B64C 27/20 |
| 10,591,175 | B2 * | 3/2020 | Karamanos .............. | F24F 11/79 |
| 10,836,485 | B2 * | 11/2020 | Welsh ..................... | B64C 27/24 |
| 2012/0325965 | A1 * | 12/2012 | Bright ................. | D06M 10/001 244/123.11 |
| 2014/0306063 | A1 * | 10/2014 | Kusnitz ................. | B64D 39/06 244/135 A |

(Continued)

*Primary Examiner* — Medhat Badawi
(74) *Attorney, Agent, or Firm* — Idea Intellectual Limited; Margaret A. Burke; Sam T. Yip (57) ABSTRACT

Arms and an associated unmanned aerial vehicle (UAV) are disclosed, which include a connecting component, a frame and arms. Each arm includes a longitudinal tube having an inverted teardrop shape-cross section with a hollow interior. The upper end of the longitudinal tube is a first curved surface. The lower end of the longitudinal tube is a second curved surface. The arc length of the first curved surface is greater than the arc length of the second curved surface. The connecting component connects the arm to the frame, and comprises an installing component and a mounting component. The installing component and the mounting component are mounted on two respective ends of the arm. The frame of UAV and the driving assembly are connected through the arm. Compared to circular shape, the raindrop/half lemniscate shape is more streamlined than those having a circular cross-sectional shape, resulting in substantially improved air fluidities.

12 Claims, 5 Drawing Sheets

(56) References Cited

U.S. PATENT DOCUMENTS

| | | | |
|---|---|---|---|
| 2016/0129998 A1* | 5/2016 | Welsh | B64C 27/24 244/12.3 |
| 2016/0375981 A1* | 12/2016 | McDonnell | B64C 39/024 244/13 |
| 2018/0093770 A1* | 4/2018 | Welsh | B64C 27/20 |
| 2019/0135425 A1* | 5/2019 | Moore | B64C 11/18 |
| 2019/0234635 A1* | 8/2019 | Karamanos | G05D 7/0676 |
| 2019/0337613 A1* | 11/2019 | Villa | B64C 29/0025 |
| 2019/0337614 A1* | 11/2019 | Villa | B64C 9/38 |
| 2020/0307814 A1* | 10/2020 | Peng | F16B 2/065 |
| 2021/0354825 A1* | 11/2021 | Koller | B64F 1/08 |
| 2021/0403155 A1* | 12/2021 | Neiser | B64C 27/20 |

\* cited by examiner

ARM FOR UNMANNED AERIAL VEHICLE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Office patent file or records, but otherwise reserves all copyright rights whatsoever.

CROSS-REFERENCE TO RELATED APPLICATIONS

This application claims priority from the China patent application serial number 201920389391.9 filed on Mar. 26, 2019, the disclosure of which is incorporated herein by reference in its entirety.

FIELD OF THE INVENTION

The present invention relates to unmanned aerial vehicles, and more particularly to structures of an arm for an associated unmanned aerial vehicle.

BACKGROUND OF THE INVENTION

Recently, the development of unmanned aerial vehicles (UAVs), also known as drones, has been rapidly popularized and widely used. The UAV uses motors installed on the wingspan of the frame, and the propeller is mounted to the output of the motor that drives the propeller to rotate. The rotation of the propeller generates a downward thrust that is able to overcome the vehicle's gravity and the air resistance during the liftoff, the landing and the flight.

The duration of flight time for UAVs is always a problem that needs to be improved. The battery capacity is fixed. The mass or self-gravity of the UAV remains the same during the flight. Therefore, the air resistance (e.g., wind-resistance) is one of the major factors that limits the flight time of the UAV. The force of the air pushing against the moving UAV is proportional to the UAV's contact area with the air. Thus, there is a need in the art to decrease the air contact area for the UAV. Such a technique could be used to increase the flight time of the UAV. That is, less air resistance will lead to consume less power from the battery, so that the flight time of the UAV is increased.

SUMMARY

It is the objective of the present invention to provide a structure of an arm for unmanned aerial vehicle (UAV) that addresses the aforementioned and other needs.

According to one aspect of the present invention, the UAV arm comprises a longitudinal tube having an inverted teardrop shape-cross section with a hollow interior. The upper end of the longitudinal tube is a first curved surface. The lower end of the longitudinal tube is a second curved surface. The arc length of the first curved surface is greater than the arc length of the second curved surface.

Accordingly, the UAV arm with the inverted teardrop shape-cross section is able to optimize the air fluidities that significantly lowers the power consumption during liftoff. The durability is increased, and thus improving the working efficiency of the UAV.

In one embodiment, the inverted teardrop shape is approximately the shape of a curve represented by the equation:

$$(y^2+x^2)^2-2a^2(y^2-x^2)=0$$

for positive values of y and wherein a is a constant indicating curve size.

In one embodiment, the arc length of the upper end is 3 to 6 times greater than the arc length of the lower end.

According to another aspect of the present invention, a UAV with aforementioned arms which comprises an installing component and a mounting component. The installing component has a fixture and an installing slot. The installing slot is formed at a center passes through an inner chamber of the fixture. The mounting component has a mounting rack and a mounting slot. The mounting slot is formed at a center passes through an inner chamber of the mounting rack. The arm passing through the installing slot and the mounting slot to connect the fixture of the installing component and the mounting rack of the mounting component.

In one embodiment, The UAV further comprises a motor base and a motor, and wherein the installing component further comprises a first fastener, a motor base and a motor. The installing component has a through hole formed at a top end at approximately the center of the installing component. A top of the first fastener penetrates upwardly through the through hole to connect the motor base to the central top portion of the fixture. The motor is mounted inside an inner chamber of the motor base.

In one embodiment, the fixture is composed of an upper fixture, a lower fixture and a second fastener. The installing slot is formed by assembling the upper fixture and the lower fixture.

In one embodiment, the fixture further comprises at least two positioning holes formed at an edge of two adjacent side walls respectively in the upper fixture and the lower fixture. The second fastener penetrates upwardly through the positioning hole of the lower fixture to the positioning hole of the upper fixture.

In one embodiment, the mounting rack is composed of an upper mounting rack, a lower mounting rack and a fastener. the mounting slot is formed by assembling the upper mounting rack and the lower mounting rack.

In one embodiment, the number of the through holes, the positioning holes and connecting holes is 4 respectively.

In one embodiment, the radial sectional view of the mounting slot and the installing slot is in a droplet shape which the smaller end is underneath the larger end.

In one embodiment, the contact surface of the upper fixture and the lower fixture, the contract surface of the upper mounting rack and the lower mounting rack are in the same plane horizontally apart with a maximum width of the arm.

BRIEF DESCRIPTION OF THE DRAWINGS

The present invention is illustrated by way of example, and not by way of limitation, in the figures of the accompanying drawings in which like reference numerals refer to the same or similar elements and in which.

DETAILED DESCRIPTION

In the following description, embodiments are set forth as examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In general, the durability flight time for an unmanned aerial vehicle (UAV) is constrained by two main factors. One is the limitation of batteries. The other one is the structure of UAV itself. The contact cross-sectional area with air is unchanged during the liftoff and landing, because the mass of the UAV remains the same. However, in flight, not just the gravitational resistance of the UAV, the force of the air pushing past the moving UAV is proportional to the UAV's contact cross-sectional area with air (assuming the velocity of the UAV is the same). The flight time of the UAV is decreased by air resistance.

Figure 1:
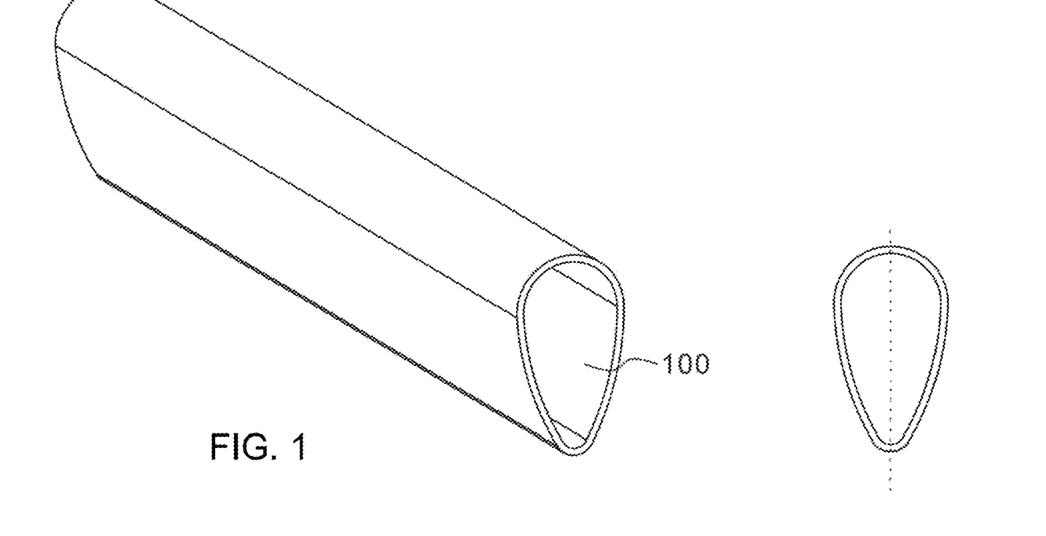
FIG. 1 is a schematic diagram illustrating an arm in accordance with an embodiment of the present invention.

With reference to FIG. 1, FIG. 1 is a schematic diagram illustrating an arm in accordance with an embodiment of the present invention. In this embodiment, the arm 100 has an inverted teardrop-shaped/water droplet shaped structure with a hollow interior in a radial sectional view. By "inverted" it is meant that the wide portion of the teardrop faces upward. The droplet-shaped arm 100 has two curved surfaces formed respectively at an upper end and a lower end. The arc length of the upper end is greater than the arc length of the lower end optionally by a factor of approximately 3 to approximately 6.

The "teardrop-shaped" cross section of FIG. 1 can be described by equation 1 below:

$$(y^2+x^2)^2 - 2a^2(y^2-x^2) = 0 \qquad \text{EQ. (1)}$$

Figure 8:
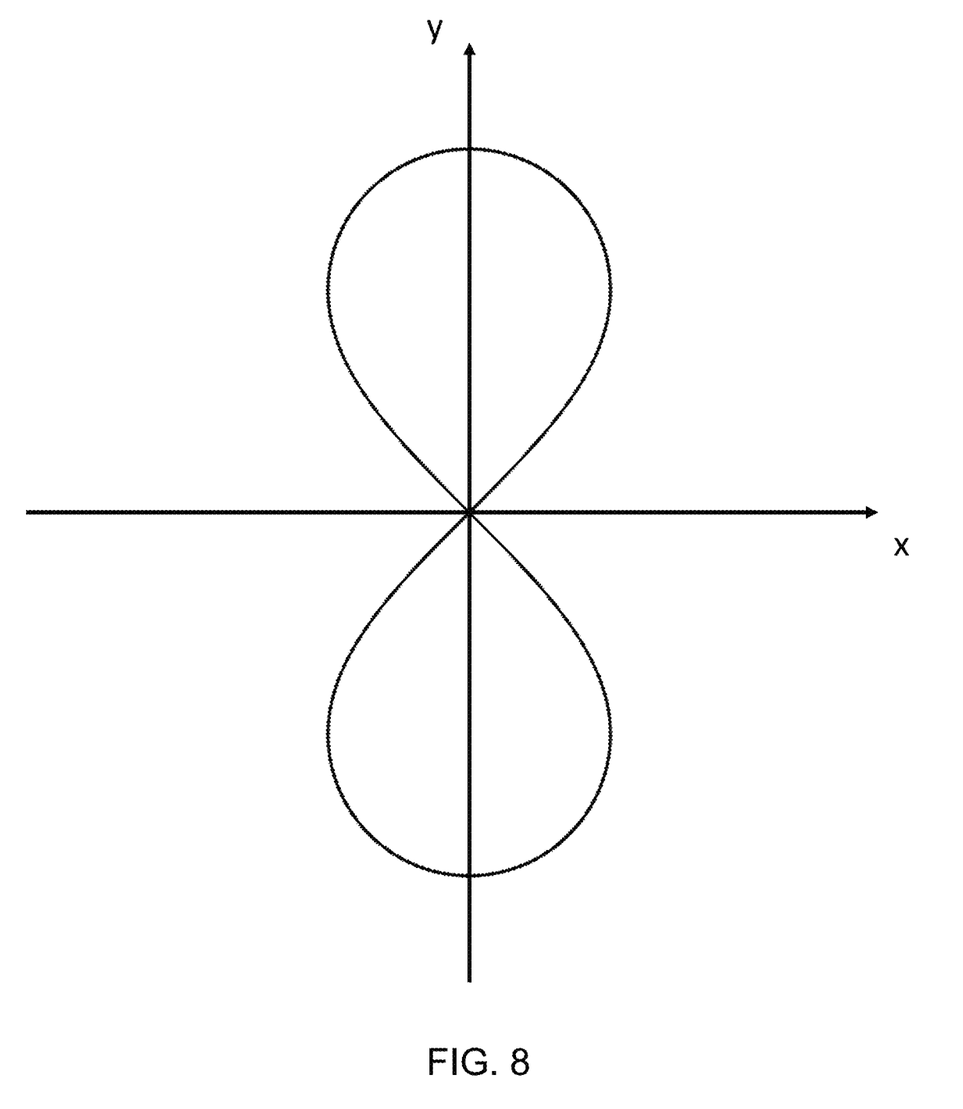
FIG. 8 is a plot of equation 1.

This equation is plotted in FIG. 8. The term "a" is a constant that defines the size. The top "teardrop" corresponds to positive values of "y." Note that when "x" and "y" are reversed in this equation, it is known as the lemniscate of Bernoulli (often referred to as a figure-8-shaped or infinity-symbol shape). A lemniscate is a plane curve with a characteristic shape, consisting of two loops that meet at a central point. Thus, the shape of the a a half-lemniscate shape, or one "drop" of the lemniscate, in this case, the top "drop".

Although, some of the conventional UAVs with streamline modeling arms are able to decrease the wind resistance during the flight, the effect of air resistance remains orthogonally when the UAV undergoes liftoff and landing. The teardrop shaped/half lemniscate structure in accordance with the present invention is able to a provide a model that is equivalent to the symmetric streamline modeling structure. With insurance of same robustness, the droplet-shaped arm 100 is able to provide better air fluidity. For another embodiment, the shape may be an oval shape or any other streamlined modeling shape.

In an embodiment for a droplet-shaped arm 100 of the present invention, as shown in FIG. 1, the arc length of the upper end is 3~6 times larger than the arc length of the lower end. The air fluidities for different scales of the droplet shaped arms 100 are different. According to the inventor's experiment, the arm 100 having the ratio that the arc length of the upper end is 3-6 times than the arc length of the lower end has better air fluidity.

Figure 2:
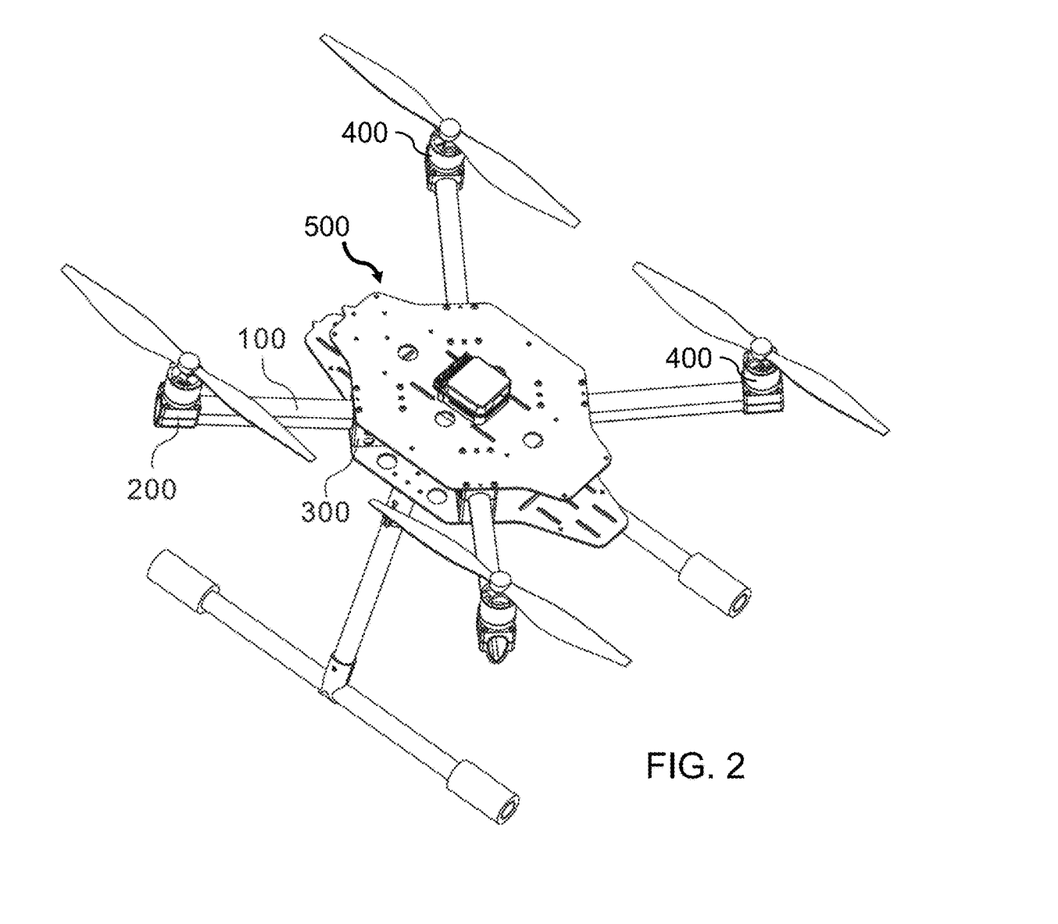
FIG. 2 is a schematic overview illustrating arms and unmanned aerial vehicle (UAV) in accordance with an embodiment of the present invention.
Figure 3:
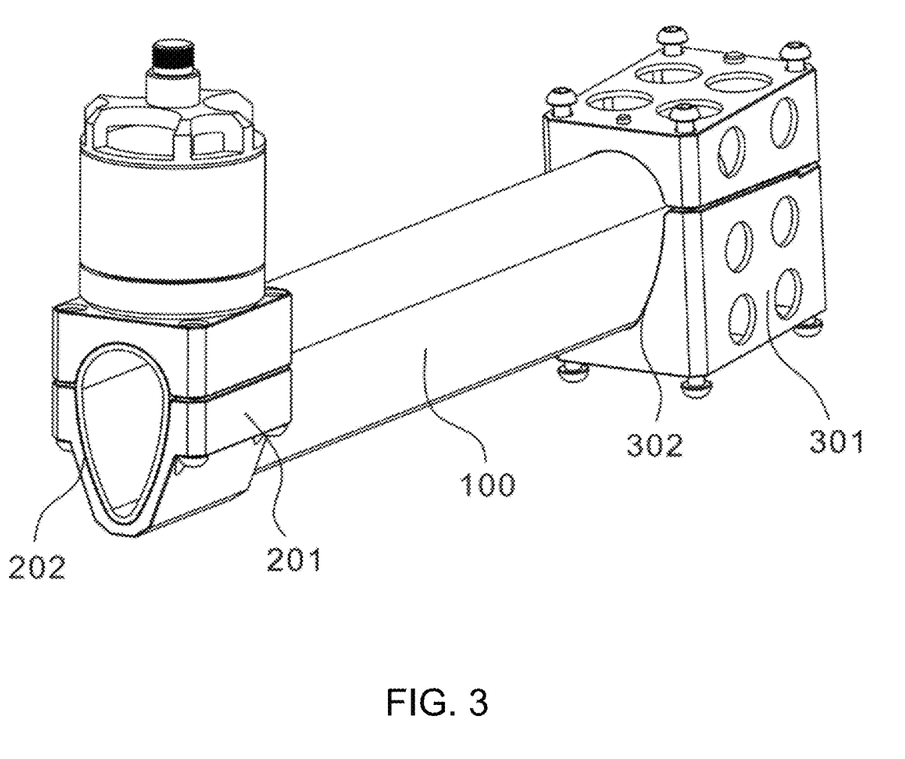
FIG. 3 is a schematic overview illustrating the connection of the arm in accordance with an embodiment of the present invention.
Figure 4:
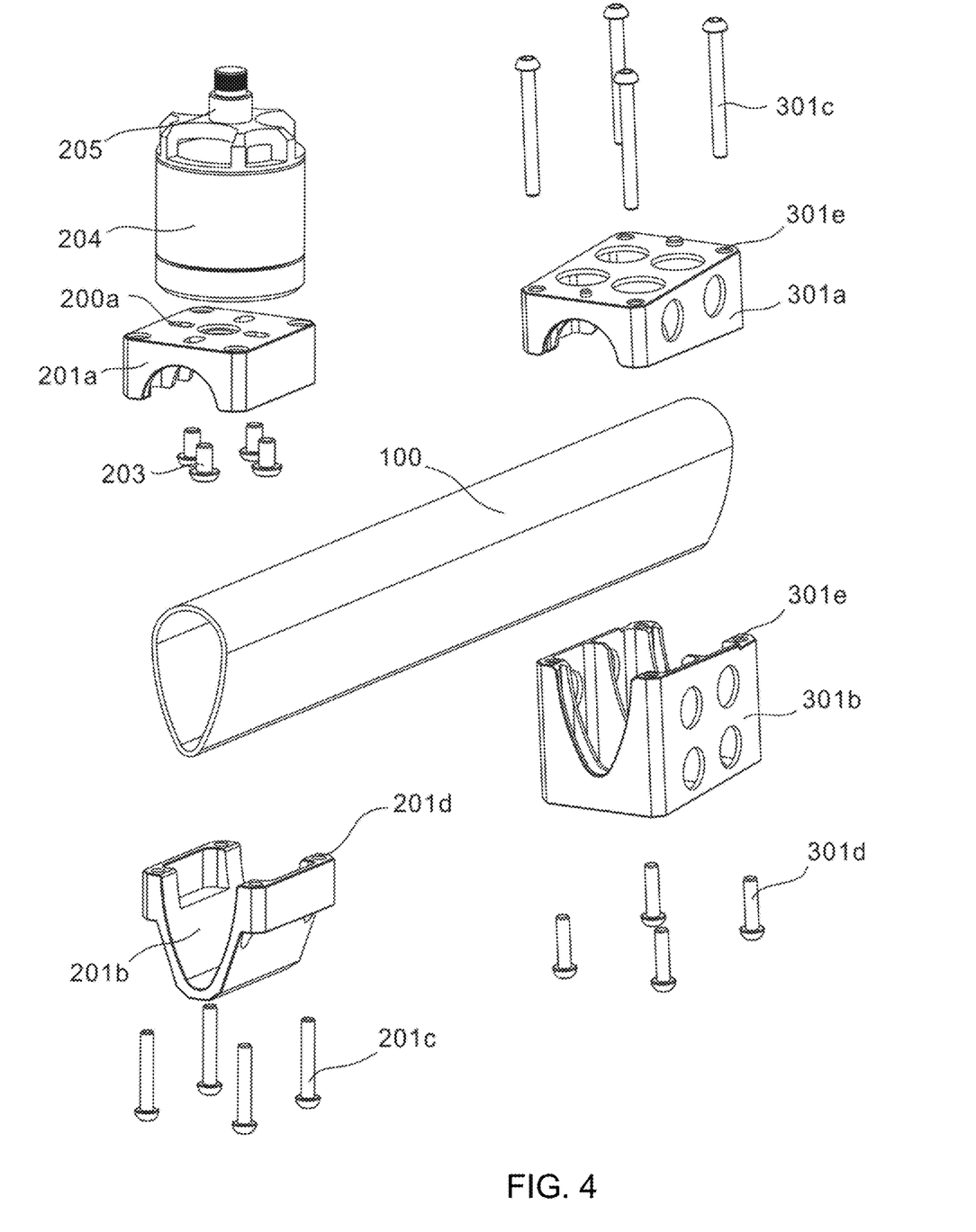
FIG. 4 is an exploded view of the arm in accordance with an embodiment of the present invention.

With reference to FIGS. 2-4, FIG. 2 is a schematic overview illustrating arms and a UAV in accordance with an embodiment of the present invention; FIG. 3 is a schematic overview illustrating the connection of the arm in accordance with an embodiment of the present invention; and FIG. 4 is an exploded view of the arm in accordance with an embodiment of the present invention. In this embodiment, the UAV comprises arm 100, installing component 200, mounting component 300 and other components such as a gimbal and other electronic control units. The installing component 200 and the mounting component 300 are mounted on two respective ends of the arm 100. The frame 500 of UAV and the driving assembly are connected through the arm 100. That is, in one embodiment, frame 500 is connected to a driving rotor 400/motor by arms 100.

The installing component 200 comprises a fixture 201 and an installing slot 202. The installing slot 202 is formed at approximately a center of the fixture 201, and penetrates through an inner chamber of the fixture 201. Note that the installing slot, to better grip the arm, has a peripheral shape of the teardrop-shaped cross-section of the arm. The installing component 200 is configured for connecting the arm 100, which receives the fixture 201 connected to the arm 100. The mounting component 300 comprises a mounting rack 301 and mounting slot 302. The mounting slot 302 is formed at approximately a center of the mounting rack 301 and passes through an inner chamber of the mounting rack 301. Similarly, the mounting slot 302 is configured for connecting the arm 100.

With reference to FIG. 4, FIG. 4 is an exploded view of the arm and mounts in accordance with an embodiment of the present invention. In this embodiment, the installing component 200 of the UAV further comprises a first fastener 203, a motor base 204 and a motor 205. A through hole 200a formed at a top end approximately the center of the installing component 200. A top of the first fastener 203 passes upwardly through the through hole 200a that connects the motor base 204 to the central top portion of the fixture 201. The motor 205 is mounted inside an inner chamber of the motor base 204 that secures the motor 205 and provides protection simultaneously. The connection between the first fastener 203 and the through hole 200a is convenient for later maintenance of the UAV.

As shown in FIG. 4, in one embodiment, the fixture 201 is composed of an upper fixture 201a, a lower fixture 201b and a second fastener 201c. The composition of the fixture 201 has more flexibility in use which is convenient for the detachment and assembling. The upper fixture 201a and the lower fixture 201b are assembled to form the installing slot 202, which achieves more flexibility and convenient in use as the arm 100 is inserted into the slot.

As shown in FIG. 4, in another embodiment, the fixture 201 comprises two positioning holes 201d formed at an edge of two adjacent side walls respectively to the upper fixture 201a and the lower fixture 201b. The positioning holes 201d of the upper fixture 201a and the lower fixture 201b correspond and communicate with each other. The front end of the second fastener 201c passes upwardly from the positioning hole 201d of the lower fixture 201b to the positioning hole 201d of the upper fixture 201a, which connects the fixture 201 as a whole. The installing slot 202 is simultaneously formed inside the inner chamber of the fixture 201. Installing slot 202 has a peripheral shape that matches the teardrop/half lemniscate shape of the arm to better grip the arm.

In yet another embodiment, as shown in FIG. 4, the mounting rack 301 is composed of an upper mounting rack 301a, a lower mounting rack 301b, a bolt 301c and a nut 301d/fasteners 301c and 301d. The assembled mounting rack 310 in the actual implementation improves the flexibilities of the components. Not only convenient for later assembling and maintenance due to the two separable components, but also convenient for carrying relevant components. The upper mounting rack 301a and the lower mounting rack 301b are assembled to form the mounting slot 302. The combination of the mounting slot 302 lowers the assembling difficulty or complexity for connecting the arm 100.

In yet other embodiment, as shown in FIG. 4, the contour ends of the upper mounting rack 301a and the lower mounting rack 301b respectively comprises symmetrically connecting holes 301e. The bolt 301c screwed with the nut 301d passes through the corresponding connecting hole 301e which firmly secures the upper mounting rack 301a and the lower mounting rack 301b forming the complete mounting rack 301.

With the embodiments shown in FIG. 4, for each of the through holes 200a, the positioning holes 201d and the connecting holes 301e 4 holes may be provided in the depicted embodiment. The quantities of the first fastener 203, the second fastener 201c, the bolt 301c and the nut 301d are corresponded to the quantities of the holes. Engaging four holes in different directions are usually sufficient to achieve a desired securing ability. Other numbers of holes may be selected depending on the desired strength of the connection.

In yet other embodiment, as shown in FIG. 4, the installing slot 202 and the mounting slot 302 have a droplet shape structure in a radial sectional view that are corresponded to the shape of the arm 100, which the arc length of the upper end is greater than the arc length of the lower end. The profiles for the inner chambers of the installing slot 202 and the mounting slot 302 are the same to the profile of the outer surface of the arm 100. In this manner, the arm 100 is easier to be installed inside the installing slot 202 and the mounting slot 302 and the arm is more securely held in the slots.

In other embodiment, as shown in FIG. 4, the contact surface of the upper fixture 201a and the lower fixture 201b, and the contact surface of the upper mounting rack 301a and the lower mounting rack 301b are in the same plane horizontally apart with the maximum width of the arm 100. In other words, each corresponding surface of the upper fixture 201a, the lower fixture 201b, the upper mounting rack 301a and the lower mounting rack 301b is in a V shape that is configured for connecting the arm 100 in detachment or assembling of the UAV.

Figure 5:
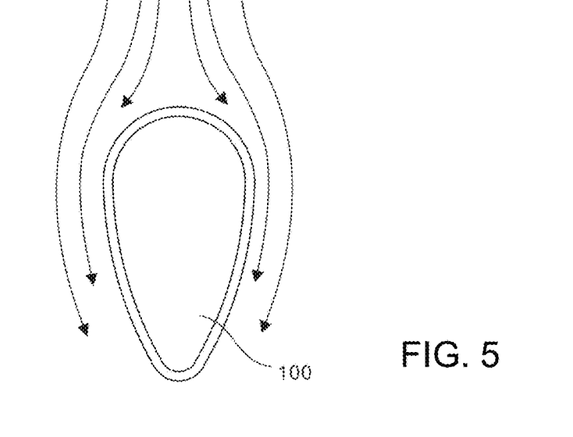
FIG. 5 is an exemplary diagram illustrating the air-flow to the arm of the present invention.

With reference to FIG. 5, FIG. 5 is an exemplary diagram illustrating the air-flow to the droplet-shaped arm 100 in accordance with embodiments of the present invention. Compared to circular shape, the raindrop/half lemniscate shape is more streamlined than those having a circular cross-sectional shape, resulting in substantially improved air fluidities.

Figure 6:
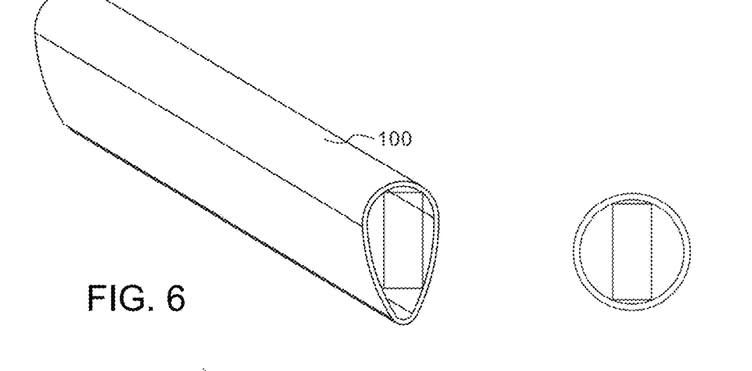
FIG. 6 is an exemplary diagram illustrating an inner space of an arm in accordance with an embodiment of the present invention.

With reference to FIG. 6, FIG. 6 is an exemplary diagram illustrating an inner space of an arm in accordance with an embodiment of the present invention. When it is required to carry a certain fixed-size load, as shown in FIG. 6, the teardrop-shaped interface can effectively reduce the interface width of the tubular body. The interface width of a conventional cylinder body is significantly larger. In other words, the space utilization rate inside the inner space of the cylinder body is lower. For the same reason, a conventional cylinder body requires more materials and thus increasing its mass.

Figure 7:
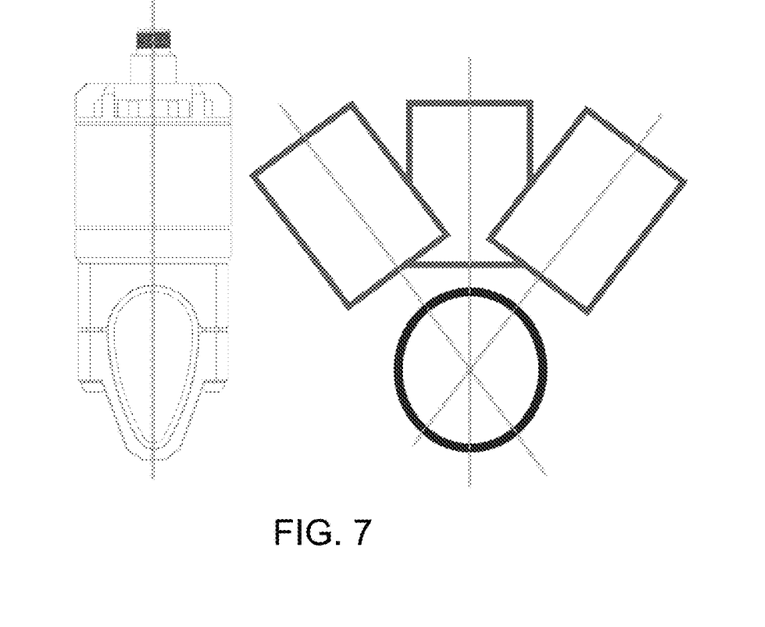
FIG. 7 is a schematic plan view in radial direction illustrating a motor base mounted on the arm in accordance with an embodiment of the present invention.

With reference to FIG. 7, FIG. 7 is a schematic plan view in a radial direction that illustrates a motor base being mounted on the arm in accordance with an embodiment of the present invention. The conventional circular cross-sectional arm is not convenient for adjusting the installing angles of the motor 205, and thus the teardrop-shaped/half lemniscate shaped cross-section can be considered more intuitive than the circular shape. In assembling, the droplet-shaped arm is able to effectively avoid the deviations during the installation of the motor 205. The efficiency for installing the motor 205 is increased.

While the disclosure has been described in connection with a number of embodiments and implementations, the disclosure is not so limited but covers various obvious modifications and equivalent arrangements, which fall within the purview of the appended claims. Although features of the disclosure are expressed in certain combinations among the claims, it is contemplated that these features can be arranged in any combination and order.

The invention claimed is:

1. An unmanned aerial vehicle comprising:
   an installing component having a fixture and an installing slot, wherein the installing slot passes through an inner chamber of the fixture;
   a mounting component having a mounting rack and a mounting slot, wherein the mounting slot passes through an inner chamber of the mounting rack; and
   an arm passing through the installing slot and the mounting slot, to connect the installing component to the mounting component, the arm comprising
   a longitudinal tube having an inverted teardrop shaped cross-section with a hollow interior, the inverted teardrop shape being approximately the shape of a curve represented by the equation:

$$(y^2+x^2)^2-2a^2(y^2-x^2)=0$$

for positive values of y and wherein a is a constant indicating curve size; and
   wherein an upper end of the longitudinal tube is a first curved surface; and
   a lower end of the longitudinal tube is a second curved surface, wherein an arc length of the first curved surface is greater than the arc length of the second curved surface.

2. The unmanned aerial vehicle as claimed in claim 1, further comprising a motor base and a motor and wherein the installing component further comprises a first fastener, the installing component has a through hole formed at a top end at approximately the center of the installing component, which is configured for a top of the first fastener penetrating upwardly through the through hole to connect the motor base to the central top portion of the fixture, and wherein the motor is mounted to the motor base.

3. The unmanned aerial vehicle as claimed in claim 2, wherein the number of through holes is 4.

4. The unmanned aerial vehicle as claimed in claim 2, wherein the fixture is composed of an upper fixture, a lower fixture and a second fastener, wherein the upper fixture and the lower fixture are assembled to form the installing slot.

5. The unmanned aerial vehicle as claimed in claim 4, wherein the fixture further comprises at least two positioning holes formed at an edge of two adjacent side walls respectively in the upper fixture and the lower fixture, such that the second fastener penetrates upwardly through the positioning hole of the lower fixture to the positioning hole of the upper fixture.

6. The unmanned aerial vehicle as claimed in claim 5, wherein the number of the positioning holes is 4.

7. The unmanned aerial vehicle as claimed in claim 1, wherein the mounting rack is composed of an upper mounting rack, a lower mounting rack, and a fastener, wherein the upper mounting rack and the lower mounting rack are assembled to form the mounting slot.

8. The unmanned aerial vehicle as claimed in claim 7, wherein the upper mounting rack and the lower mounting rack include connecting holes that allows fastener to secure the upper mounting rack to the lower mounting rack.

9. The unmanned aerial vehicle as claimed in claim 8, wherein the number of connecting holes is 4.

10. The unmanned aerial vehicle as claimed in claim 9, wherein a contact surface of the upper fixture and the lower fixture, and a contract surface of the upper mounting rack and the lower mounting rack are in the same plane horizontally apart with a maximum width of the arm.

11. An unmanned aerial vehicle arm, comprising:
a longitudinal tube having an inverted teardrop shaped-cross section with a hollow interior wherein the inverted teardrop shape is approximately the shape of a curve represented by the equation:

$$(y^2+x^2)^2-2a^2(y^2-x^2)=0$$

for positive values of y and wherein a is a constant indicating curve size; and
wherein an upper end of the longitudinal tube is a first curved surface; and
a lower end of the longitudinal tube is a second curved surface, and an arc length of the first curved surface is greater than the arc length of the second curved surface.

12. The arm as claimed in claim 1, wherein the arc length of the upper end is 11 to 6 times larger than the arc length of the lower end.

* * * * *